Jan. 16, 1951     J. C. KALBACH ET AL     2,538,201
METHOD OF REDUCING METALLIC OXIDES
Filed Aug. 17, 1944     2 Sheets-Sheet 1
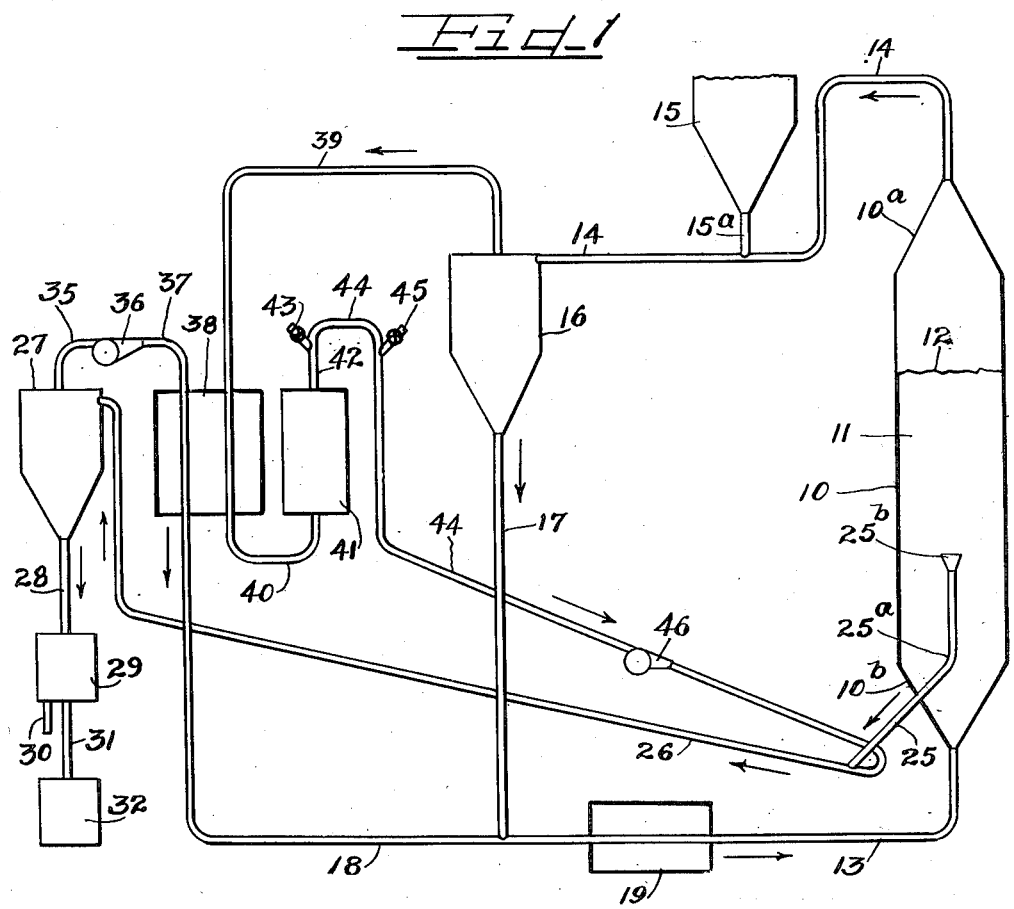
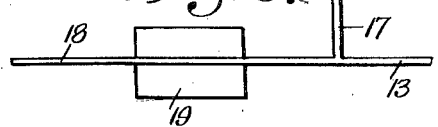
Inventors
John C. Kalbach.
Vincent S. de Marchi.
Frederick W. Sullivan Jr.
by Charles W. Hill Atty's.

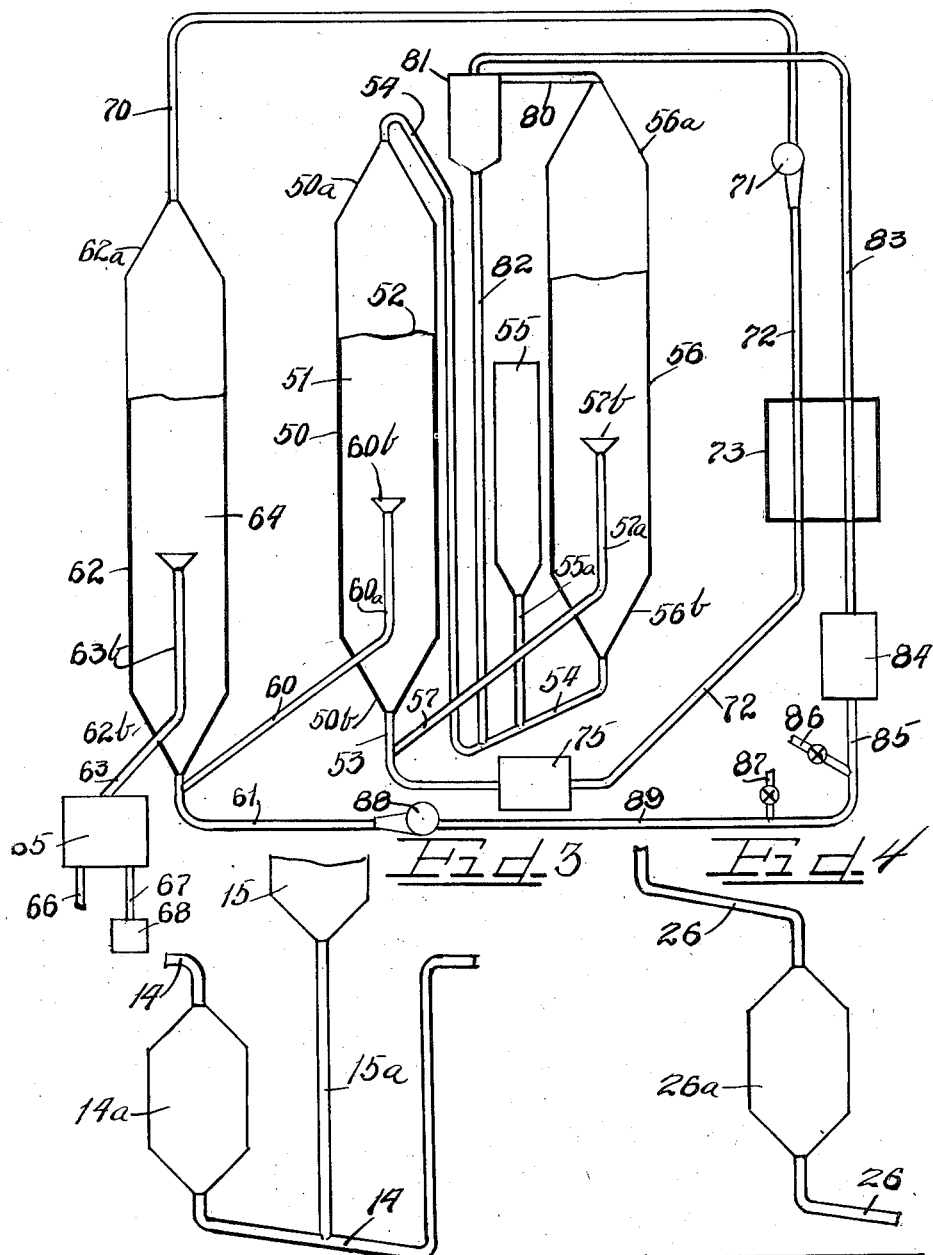

Patented Jan. 16, 1951

2,538,201

UNITED STATES PATENT OFFICE 2,538,201

METHOD OF REDUCING METALLIC OXIDES

John C. Kalbach and Vincent S. de Marchi, Chicago, Ill., and Frederick W. Sullivan, Jr., Summit, N. J., assignors, by mesne assignments, to Inland Steel Company, Chicago, Ill., a corporation of Delaware Application August 17, 1944, Serial No. 549,914

5 Claims. (Cl. 75—26)

This invention relates to a method and apparatus for preparing heavy metals by reduction of their oxides with a gaseous medium. More particularly, the invention pertains to methods and apparatus for isolating iron, nickel, cobalt, copper and like metals from their oxides by reduction with a gaseous medium containing hydrogen and/or carbon monoxides as active reducing ingredients.

The present invention is particularly directed to the reduction of heavy metal oxides reduced to a finely particulate state and distended with gas to form a "fluidized" mass. By the term "heavy metal" is meant a metal having a specific gravity greater than 4. The nature of the "fluidized" state will be apparent from the following description.

It is possible under proper conditions to impart to a bed of solid particles such a degree of mobility that the particles are capable of flowing in a manner essentially similar to the flow of liquids. Such mobility is obtained, for instance, when a mass or bed of solid particles is subjected to the action of an upwardly flowing gaseous medium of preferably uniform velocity distribution. Uniformity of velocity distribution does not imply uniformity of volumetric flow rate, inasmuch as the gaseous current may be of uniform velocity distribution, and at the same time may vary greatly in volumetric flow rate, and may even be intermittent.

When the conditions are properly adjusted, such a mass of solid particles acquires many of the essential characteristics of a liquid. For example, the upper surface of a fluidized mass or mixture automatically assumes and maintains a horizontal plane if permitted to do so, and if this surface is disturbed by an external force, it quickly resumes a horizontal position, in all respects like a liquid. A vibration imparted to the receptacle containing a mass of particles in a fluidized state with an apparently quiescent surface level will cause a wave to move over the surface of the mass, resembling very perfectly a wave which would be produced on the surface of a liquid subjected to a like vibration. If a solid rod is thrust into a mass of particles in this mobile condition, it will meet with no greater resistance than if thrust into a liquid having a density equal to the density of the fluidized mass.

A sharp distinction should be made between particulate material in "fluidized" condition, on the one hand, and gas containing entrained particles or gas through which particles are falling in a shower, on the other hand. The term "fluidized mass" is used in this application to designate a "pseudo-liquid" such as may be formed by passing an aeriform fluid upwardly through a preferably but not necessarily stationary mass of confined small particles of solid material at such a rate that the particles assume limited freedom of motion, the whole mass having physical properties similar to those of a boiling fluid. The particles are not entrained in the aeriform fluid but are in independent random motion. The fluidized mass, as a body, is in a turbulent motion comparable to the motion of a boiling fluid, if not bodily moved by the aeriform fluid. In certain instances, the body of fluidized material may be slowly translated through a confined space by the aeriform fluid, but then at a rate much slower than the velocity of the aeriform fluid passing through the fluidized mass.

The "pseudo-liquid" is a fluidized mass having a density much greater than that of the same aeriform fluid with entrained particles of the same kind of solids. Thus, in a "fluidized mass," the lineal motion of the particles does not conform with the motion of the fluidizing medium, and is altogether different from the motion of particles entrained in the gaseous medium.

Very briefly, fluidized material may be said to consist of dry, finely particulate, solid material distended with a gas to render the material fluid, and, at least to some extent, subject to the laws of hydrostatics and hydrodynamics. A fluidized mass, in other words, is a mixture of finely divided solid material and gas having many of the physical properties of a viscous liquid and characterized by a density intermediate that of the solid material per se and that of a dispersion of the conventional type of the same solid material in the same gas.

The term "suspension" is used generically in this specification and in the claims to include fluidized material, entrained particles, and dispersions of the conventional type, but not particles falling in a shower.

It is an important object of the present invention to provide methods and apparatus for carrying out metallurgical operations on solid material in a fluidized state.

Another object of the present invention is to provide methods and apparatus for reducing the oxides of heavy metals while in a fluidized state.

A further object of this invention is to provide methods and apparatus for the reduction of oxides of iron with hydrogen and/or carbon monoxide-containing gases.

A still further object of the invention is to provide methods and apparatus for establishing and maintaining suitable material transfer, heat exchange and temperature conditions in metallurgical operations carried out on suspended and/or fluidized material.

Other and further objects and features of the present invention will become apparent from the following description of an example of the application of the principles of this invention to the reduction of iron ore to metallic iron.

Reference is made to the appended drawings which show in diagrammatic form apparatus suitable for the direct reduction of comminuted iron ore to metallic iron. More particularly:

Figure 1 represents an apparatus for the purpose indicated in which fluidization is confined to the reduction zone;

Figure 2 represents an apparatus for the purpose indicated in which fluidization is effected in heat exchange zone drained of solid material at lower portions thereof; and Figures 3 and 4 show fluidizing devices that may be incorporated with the apparatus of Figure 1 for effecting heat exchange.

Figure 5 is a fragmentary view of a modification of the apparatus of Figure 1.

As shown in Figure 1, a reduction apparatus according to the present invention may include a generally cylindrical reaction chamber 10 terminating in upper and lower frusto-conical segments 10a and 10b. Contained within the reaction chamber 10 is a fluidized mass 11 of particulate iron ore having a well defined upper pseudo-liquid level 12. Hot fluidizing reducing gas is admitted to the bottom of the reaction chamber 10 through a conduit 13. Due to the frusto-conical form of the bottom of the reaction chamber, all the particulate solid material is traversed by fluidizing gas.

If desired, the reaction chamber can take the form of a hollow tube of uniform cross-sectional area and having a false bottom formed of porous tile, grate-like or other foraminous material. Fluidizing gas admitted into such a structure below the false bottom will be uniformly distributed throughout the cross-sectional area of the reaction chamber, so that all the solid material will be fluidized.

The reducing gas, after passing through the fluidized mass, is vented from the top of the reaction chamber through a conduit 14 for admixture with fresh ore admitted into the conduit 14 through a discharge passage 15a from an ore hopper 15 containing finely particulate iron ore capable of being fluidized by the spent reducing gas. The resulting suspension (or, more specifically, entrainment) of iron ore in hot spent reducing gas moves in heat exchanging relationship to a cyclone 16 for separation of the then preheated iron ore from the spent reducing gas. If the reducing potency of the spent gas has not been diminished to an excessive degree, some reduction of the ore will be effected coincidentally with the heat exchange.

The separated preheated and possibly partially reduced iron ore is moved from cyclone 16 through a conduit 17 into a conduit 18 for admixture with fresh reducing gas. The resultant suspension (or, more specifically, entrainment) of iron ore in fresh reducing gas flows through a preheater 19 into the conduit 13 (which is a continuation of conduit 18) and thence into the bottom portion 10b of the reaction chamber 10.

The preheater 19 can also be positioned in the conduit 18 ahead of the junction with conduit 17. This arrangement is preferred when the preheater 19 takes the form of a regenerator, as shown in Figure 5.

Reduced metallic iron is removed from the reaction chamber 10 by means of a tubular member 25 piercing the side of the conical bottom section 10b and having one portion 25a inside the reaction chamber 10 wholly immersed within the fluidized mass 11. Preferably the tubular member 25a terminates in an outwardly flared open top portion 25b disposed well above the bottom of the reaction chamber 10 but at the same time spaced well below the pseudo-liquid level 12. The fluidized mass flows through the conduit 25 into a conduit 26 for fresh reducing gas. In this conduit, the resultant suspension (or entrainment) of hot reduced iron in fresh reducing gas flows in heat exchanging relationship to a cyclone 27 where the gas and the solid material are separated, the reduced iron having been cooled in a non-oxidizing atmosphere to a temperature below the Curie point. If the reduced material still contains residual unreduced oxides, the fresh reducing gas may convert some or all of these residual oxides into metal coincidentally with the heat exchange. The reduced iron is moved from the cyclone 27 through a conduit 28 into a magnetic separator 29. The less magnetic fraction ("tailings") obtained in the magnetic separator 29 is discharged through a conduit 30 while the more magnetic fraction containing the reduced iron moves through conduit 31 for further treatment, for instance, briquetting, in suitable equipment 32.

It will be noted that both the magnetic separation and the subsequent mechanical treatment are carried out in a non-oxidizing atmosphere.

The fresh gas is vented from the cyclone 27 through a conduit 35 and moved by a blower 36 through a further conduit 37 passing through a heat exchanger 38 for discharge into the conduit 18.

Heat is furnished in the heat exchanger 38 by spent reducing gas vented from the cyclone 16 through a conduit 39. From the heat exchanger 38 the spent reducing gas passes through a conduit 40 into a scrubber 41 of suitable construction for removal of gaseous products of oxidation such as water and carbon dioxide. The scrubbed gas is conducted from scrubber 41 through a conduit 42 for recovery as a by-product (through valved conduit 43) or for recirculation through the reduction apparatus by means of a pipe 44, fresh reducing gas being admitted through a valved conduit 45. A blower 46 is preferably inserted in the conduit 44 prior to the junction of the conduit 25 and the conduit 26.

It will be noted that the solids are subjected to the following process steps:

1. Heat transfer to fresh ore suspended in hot spent reducing gas (conduit 14) with possible coincident partial reduction.

2. Separation of fresh ore from spent gas (cyclone 16).

3. Admixture of ore with fresh reducing gas (conduit 18) partially preheated by heat exchange with spent gas.

4. Final preheating of ore suspended in fresh reducing gas (preheater 19).

5. Reduction of ore in fluidized state (reaction chamber 10).

6. Separation of reduced iron from spent reducing gas and discharge in fluidized state from reaction chamber at a point above the bottom thereof (conduit 25).

7. Cooling of reduced iron suspended in fresh reducing gas (conduit 26) with possible coincident reduction of residual oxide.

8. Separation of reduced iron from preheated fresh reducing gas (cyclone 27).

9. Magnetic separation of reduced iron in a non-oxidizing atmosphere (separator 29).

10. Briquetting of reduced iron in a non-oxidizing atmosphere (briquetting device 32).

The reducing gas is subjected to the following process steps:

1. Preheating of fresh reducing gas by reduced iron (conduit 26) with possible partial oxidation by residual oxide.

2. Separation of preheated gas from reduced iron (cyclone 27).

3. Heat transfer to preheated fresh gas from spent gas (heat exchanger 38).

4. Admixture of fresh reducing gas with ore to be reduced (conduit 18).

5. Final preheating (preheater 19) with possible further partial oxidation.

6. Oxidation in reduction of ore in fluidized state (reaction chamber 10).

7. Separation of spent gas from reduced iron (reaction chamber 10).

8. Heat exchange of spent gas with fresh ore (conduit 14) with possible further partial oxidation.

9. Separation of spent gas from preheated ore (cyclone 16).

10. Heat exchange of spent gas with fresh reducing gas (heat exchanger 38).

11. Scrubbing of spent gas for removal of water and/or carbon dioxide (scrubber 41).

12. Recovery as a by-product or recycling to step 1 (conduits 43 and 44).

The following heat transfers are effected:

1. Transfer of heat to fresh reducing gas and ore from a source of heat (preheater 19).

2. Heat exchange between hot reduced ore and fresh reducing gas (conduit 26).

3. Heat exchange between fresh ore and hot spent reducing gas (conduit 14).

4. Heat exchange between hot spent reducing gas and fresh reducing gas (heat exchanger 38).

The preheater 19 and the heat exchanger 38 may take any desired conventional form adapted to transfer heat to the fresh reducing gas. In certain circumstances, the heat exchanger 38 may take the form of a recuperator.

The cyclones 16 and 27 may be constructed according to any conventional design, or other apparatus suitable for separating gas from finely divided solid particles may be used.

The magnetic separator 29 may be constructed along conventional lines. The briquetting or agglomerating device 32 may consist of any suitable device for building up the finely divided reduced metal into coherent lumps.

The individual particles of the fluidized mass 11 in the reaction chamber 10 are in constant state of vibrant or random movement. As a body, the fluidized mass in the reaction chamber 10 is stationary, but material introduced at the bottom through conduit 13 gradually displaces previously introduced material upwardly at least to the level of the flared opening 25b of the conduit 25.

If desired, the system can be run on a batch basis, a suitable quantity of iron ore being introduced into the reaction chamber 10 and completely reduced before additional material is moved into the chamber 10. Continuous operation can also be carried out, with constant additions of relatively smaller amounts of iron ore to the mass already present in the reaction chamber and constant removal of corresponding quantities of reduced material. In continuous operation, the rate of addition and withdrawal of ore from the reaction chamber 10 is adjusted, in accordance with the rate of reduction in the reaction chamber 10, so that, on an average, each individual particle of iron ore is permitted to stay long enough in the reaction chamber 10 to effect a satisfactory degree of reduction.

The length of the discharge tube 25a is such as to insure a period of stay of iron ore in the reaction chamber 10 not below a predetermined minimum. The height of the flared opening 25b is adjusted so that one of the short successive circulatory or random movements of the individual particles will not enable the particles to pass directly from the bottom intake of the reduction chamber into the discharge tube 25a. Short-circuiting of the particles thus being prevented, the average length of exposure of the oxide particles to reducing gas can be adjusted at will.

In the heat exchange between gas and ore taking place in conduits 14 and 26, the heat exchanging materials move confluently to separating devices. The mechanical difficulties inherent in countercurrent heat exchange between gases and finely particulate solid material are thereby avoided.

If desired, a portion of the conduit 14 may be formed into U-shape on both sides of the conduit 15a, and a section 14a of the conduit 14 may be enlarged, as shown in Figure 3, to the same diameter as the reduction chamber 10, and provided with conical ends. The gas velocity in the section 14a is reduced to a point where fluidization occurs. The section 14a can be completely filled with pseudo-liquid material. Entraining mass transport is resumed at the upper end of the section 14a.

Similarly, as shown in Figure 4, the conduit 26 may be enlarged, as at 26a, to the same diameter as the reduction chamber 10, for effecting fluidization of reduced material by fresh reducing gas. The device of Figure 4 may be inserted into the conduit 26, for instance, at the elbow bend shown to the left of the upright portion of the conduit 18 of Figure 1.

In the devices of Figures 3 and 4, heat exchange is effected between gases and fluidized finely particulate solid material moving confluently at different velocities, the solid material being subjected to heat exchange with successive volumes of gas.

As shown in Figure 2, we have also provided an apparatus wherein heat exchange is effected between successive volumes of gases and a body of solid material in fluidized condition, solid material being withdrawn from heat exchange zones in a manner similar to the reduction step illustrated in Figure 1. The apparatus of Figure 2 includes a generally cylindrical reaction chamber 50 terminating in upper and lower frusto-conical sections 50a and 50b. Contained within the reaction chamber 50 is a fluidized mass 51 of particulate iron ore having a well defined upper pseudo-liquid level 52. Hot fluidizing reducing gas is admitted to the bottom of the reaction chamber 50 through a conduit 53.

The reducing gas, after passing through the fluidized mass 52, is vented from the top of the reaction chamber 50 through a conduit 54 for admixture with fresh ore admitted into the conduit 54 through a discharge passage 55a from an ore hopper 55 containing finely particulate iron ore capable of being fluidized by the spent reducing gas. The resulting entrainment of iron ore in hot spent reducing gas moves into a fluidizing chamber 56 terminating in upper and lower frusto-conical segments 56a and 56b. In the chamber 56, fresh iron ore is pre-heated by and separated from successive volumes of hot spent reducing gas. Separation is effected when fluidized pre-heated iron ore is discharged from the chamber 56 through a conduit 57 piercing the side of the lower frusto-conical segment 56b of the chamber 56 and having a portion 57a wholly immersed within the fluidized mass in the chamber 56 and terminating in a flared end portion 57b. The conduit 57 discharges into the conduit 53 where the pre-heated iron ore is picked up by fresh reducing gas and transferred into the reduction chamber 50.

Reduced metallic iron is removed from the reaction chamber 50 by means of a tubular member 60 piercing the side of the conical bottom section 50b and having one portion 60a inside the reaction chamber 50 wholly immersed within a fluidized mass 51. Preferably the tubular member 60 terminates in an outwardly flared open top portion 60b disposed well above the bottom reaction chamber 50 but at the same time spaced from the pseudo-liquid level 52. The fluidized mass flows through the conduit 60 into a conduit 61 for fresh reducing gas. In this conduit, the resulting entrainment of hot reduced iron in fresh reducing gas flows to another fluidizing chamber 62 having an upper frusto-conical end 62a and a lower frusto-conical end 62b. The reduced iron entering the bottom of the fluidizing chamber 62 is therein fluidized by the fresh reducing gas for pre-heating the latter. The reduced iron is discharged from the fluidizing chamber 62 by means of a conduit 63 piercing the side of the lower conical end 62b of the fluidizing chamber and having a portion 63b wholy immersed within the mass of fluidized iron 64 in the fluidizing chamber 62. The conduit 63 discharges fluidized iron ore into a magnetic separator 65. The less magnetic fraction ("tailings") obtained in the magnetic separator 65 is discharged through a conduit 66 while the more magnetic fraction containing the reduced iron moves through a conduit 67 for further treatment such as briquetting in suitable equipment 68.

Pre-heated fresh reducing gas is vented from the fluidizing chamber 62 through a conduit 70 and moved by a blower 71 through a further conduit 72 passing through a heat exchanger 73 for discharge into the conduit 53. Preferably, a pre-heater 75 is inserted at a junction between conduits 72 and 53.

Heat is furnished in the heat exchanger 73 by spent reducing gas vented from fluidizing chamber 56 through a conduit 80. This latter conduit discharges into a cyclone 81 having a conduit 82 permitting drainage of separated solid material into the conduit 54. From the cyclone 81, the spent reducing gas is conducted by means of a conduit 83 through the heat exchanger 73 and into a scrubber 84 for removing oxidized constituents such as water and/or carbon dioxide. The scrubbed gas is conducted from scrubber 84 through a conduit 85 for recovery as a by-product (through valve conduit 86) or for recirculation through the reduction apparatus by means of a pipe 89, fresh reducing gas being admitted for make-up purposes through a valved conduit 87. A blower 88 is preferably inserted in the conduit 89 prior to the junction of the conduit 89 and the conduit 61.

It will be noted that the process steps carried out in the apparatus of Figure 2 differ from the process steps carried out in the apparatus of Figure 1. In the last described apparatus, both heat exchange and chemical reaction are effected with the solid material in fluidized condition. Further, when heat exchange between finely divided solid material and reducing gas is effected, the solid material is traversed by successive volumes of gas. The fluid and solid heat exchanging material are then not moving confluently at the same velocity. After heat exchange has taken place, the fluidized solid material flows under the influence of gravity toward the point where the next process step is carried out.

A salient feature of the apparatus of the present invention is the fact that the solid material to be reduced and the reduced solid material can be handled exclusively by means of a suitable pipe and valve system with the motive power furnished exclusively by means of pumps or blowers. The intimate commingling of gas and finely particulate solid material facilitates uniform, complete and rapid reduction and greatly enhances the efficiency of heat transfer between solids and gases. Even at elevated temperatures, the difference in temperature between the top and the bottom of the pseudo-liquid in the reduction chamber often does not exceed 10° F., due to the circulatory movement of the individual particles in the fluidized mass and due to the turbulent action induced by the fluidizing gas.

The same chemical reactions can be carried out in all the apparatus described hereinabove with the same oxides and the same reducing gases.

The degree of comminution required for effecting fluidization of the material to be reduced varies according to the nature of the solid material to be reduced and the desired rate of gas movement through the reactors 10 and 50. In general, comminution to 60 to 100 mesh is sufficient.

For reducing hematite or magnetite, a temperature of from about 1000° to about 1800° F. should be maintained in the reaction chambers 10 and 50.

Sintering, agglomeration or lumping may occur at temperatures of 1400° F. or higher, especially when certain forms of magnetite are reduced, with consequent difficulty in fluidizing the solid material. Such sintering or agglomeration may be eliminated by the addition of, say, from 5 to 10 or more percent of finely divided carbon, for instance, 60 mesh graphite. Such addition also eliminates any tendency to formation of pyrophoric material. The added carbon is removed, along with, for instance, whatever silica may be present in the original ore, in the magnetic separators 29 and 65.

The operation of the above described apparatus is illustrated, by way of example, in the following description of the reduction of mill scale.

The mill scale in question is a fairly pure magnetite containing 70.50% total iron, 0.010% phosphorus, 0.35% manganese, 0.09% aluminum oxide, 0.28% silica, 0.52% sulphur, 0.10% calcium oxide and 3.33% carbon. This analysis is obtained after the mill scale has been calcined on an open flame to remove 7.3% of material volatile at 110° C. and 3% of additional material extractible with benzene.

Mill scale thus prepared is ground until 1.8% has a particle size between 20 and 60 mesh, 15.1% has a particle size between 60 and 100 mesh, 24% has a particle size between 100 and 200 mesh, 19.4% has a particle size between 200 and 325 mesh, and 20.4% has a particle size of less than 325 mesh.

Reduction of the above described mill scale is carried out in a reaction chamber having a cross-section of 0.088 square feet, the height of the pseudo-liquid being 1.25 feet, and its volume being 0.104 cubic feet. Pure hydrogen is passed through this pseudo-liquid at the rate of 1 cubic foot per minute at a temperature of between 1070° and 1090° F. for one hour and forty minutes.

No sintering or agglomeration occurs at this temperature.

The magnetic separator divides the reduced mill scale into a magnetic fraction amounting to 98.5% and a non-magnetic fraction amounting to 1.5%. The magnetic fraction has a total iron content of 94.7%, of which 92.1% is metallic iron. 97.3% of the total iron content is thus reduced to metallic iron. The silica content of the magnetic fraction is less than 0.05%.

Any oxide of iron (magnetite, hematite, or ferrous oxide) or any other oxide of a heavy metal may be reduced as described hereinabove with similar results. In certain cases, adjustment in time and temperature of reduction must be made in accordance with the nature of the material being reduced and the nature of the exact gas used for reduction purposes.

Other gases than pure hydrogen may be used for reducing purposes, such as blue gas, coke oven gas, cracked coke oven gas, and the like.

Depending upon the nature of the oxidized product present in the spent reducing gas, the scrubbers 41 and 84 are selected from conventional equipment capable of removing water, carbon dioxide or mixtures thereof from the spent reducing gases.

In any case, provision is made for effecting heat transfer and chemical reaction between gas and solid material in suspended or particularly in fluidized condition and for confluent movement of gas and solid material in all instances except when, as may be necessary or desirable in the reaction chambers 10 and 50 or in the fluidizing chambers 56 and 62, the solid material is acted upon by successive volumes of gas.

It should be clearly understood that the above cited specific solid materials to be reduced and specific reducing agents have been given solely by way of example. Many details of composition, construction and operation may be varied within a wide range without departing from the principles of this invention, and it is, therefore, not our purpose to limit the patent granted on this invention otherwise than necessitated by the scope of the appended claims.

We claim as follows:

1. A method of reducing a heavy metal oxide to free metal at an elevated temperature with reducing gas which is spent in the course of said reduction, said method comprising providing said oxide in finely particulate form for fluidization by said gas, initially suspending said oxide in spent hot reducing gas, flowing the resulting first suspension into an oxide preheating first zone, withdrawing preheated oxide from the lower part of said first zone, drawing off spent reducing gas from the upper part of said first zone, thereafter suspending the withdrawn preheated oxide in preheated fresh reducing gas, flowing the resulting second suspension into a second zone for concurrent fluidization and reduction of said oxide by said gas in said second zone, drawing off hot spent reducing gas from the upper part of said second zone, withdrawing hot reduced oxide from the lower part of said second zone, thereafter suspending said reduced oxide in fresh reducing gas, flowing the resulting third suspension into a fresh gas preheating third zone, drawing off preheated fresh reducing gas from the upper part of said third zone and withdrawing reduced oxide from the lower part of said third zone.

2. A method of reducing a heavy metal oxide to free metal at an elevated temperature with reducing gas which is spent in the course of said reduction, said method comprising providing said oxide in finely particulate form for fluidization by said gas, initially suspending said oxide in spent hot reducing gas, flowing the resulting first suspension into a first zone for concurrent fluidization and preheating of said oxide by said hot spent reducing gas, withdrawing preheated oxide from the lower part of said first zone, drawing off spent reducing gas from the upper part of said first zone, thereafter suspending the withdrawn preheated oxide in preheated fresh reducing gas, flowing the resulting second suspension into a second zone for concurrent fluidization and reduction of said oxide by said gas in said second zone, drawing off hot spent reducing gas from the upper part of said second zone, withdrawing hot reduced oxide from the lower part of said second zone, thereafter suspending said reduced oxide in fresh reducing gas, flowing the resulting third suspension into a third zone for concurrent fluidization of said reduced oxide by said fresh gas and preheating of said gas by said oxide, drawing off preheated fresh reducing gas from the upper part of said third zone and withdrawing reduced oxide from the lower part of said third zone.

3. A method of reducing a heavy metal oxide to free metal at an elevated temperature with reducing gas which is spent in the course of said reduction, said method comprising providing said oxide in finely particulate form for fluidization by said gas, initially suspending said oxide in spent hot reducing gas, flowing the resulting first suspension into an oxide preheating first zone, withdrawing preheated oxide from the lower part of said first zone, drawing off spent reducing gas from the upper part of said first zone, thereafter suspending the withdrawn preheated oxide in preheated fresh reducing gas, flowing the resulting second suspension into a second zone for concurrent fluidization and reduction of said oxide by said gas in said second zone, drawing off hot spent reducing gas from the upper part of said second zone, withdrawing hot reduced oxide from the lower part of said second zone, thereafter suspending said reduced oxide in fresh reducing gas, flowing the resulting third suspension into a fresh gas preheating third zone, drawing off preheated fresh reducing gas from the upper part of said third zone and withdrawing reduced oxide from the lower part of said third zone, hot spent reducing gas drawn off from said second zone being employed to form said first suspension and preheated fresh gas drawn off from said third zone being employed to form said second suspension.

4. A method of reducing a heavy metal oxide to free metal at an elevated temperature with reducing gas which is spent in the course of said reduction, said method comprising providing said oxide in finely particulate form for fluidization by said gas, initially suspending said oxide in spent hot reducing gas, flowing the resulting first suspension into an oxide preheating first zone, withdrawing preheated oxide from the lower part of said first zone, drawing off spent reducing gas from the upper part of said first zone, thereafter suspending the withdrawn preheated oxide in preheated fresh reducing gas, flowing the resulting second suspension into a second zone for concurrent fluidization and reduction of said oxide by said gas in said second zone, drawing off hot spent reducing gas from the upper part of said second zone, withdrawing hot reduced oxide from the lower part of said second zone, thereafter suspending said reduced oxide in fresh reducing gas, flowing the resulting third suspension into a fresh gas preheating third zone, drawing off preheated fresh reducing gas from the upper part of said third zone, withdrawing reduced oxide from the lower part of said third zone, hot spent reducing gas drawn off from said second zone being employed to form said first suspension and preheated fresh gas drawn off from said third zone being employed to form said second suspension, removing oxidized constituents from the cooled spent gas drawn off from said first zone and thereafter incorporating reducing gas with said spent gas to make up fresh reducing gas whereby reducing gas can be recirculated through said three zones.

5. A method of reducing a heavy metal oxide to free metal at an elevated temperature with reducing gas which is spent in the course of said reduction, said method comprising providing said oxide in finely particulate form for fluidization by said gas, initially suspending said oxide in spent hot reducing gas, flowing the resulting first suspension into an oxide preheating first zone, withdrawing preheated oxide from the lower part of said first zone, drawing off spent reducing gas from the upper part of said first zone, thereafter suspending the withdrawn preheated fresh reducing gas, flowing the resulting second suspension into a second zone for concurrent fluidization and reduction of said oxide by said gas in said second zone, drawing off hot spent reducing gas from the upper part of said second zone, withdrawing hot reduced oxide from the lower part of second zone, thereafter suspending said reduced oxide in fresh reducing gas, flowing the resulting third suspension into a fresh gas preheating third zone, drawing off preheated fresh reducing gas from the upper part of said third zone and withdrawing reduced oxide from the lower part of said third zone, hot spent reducing gas drawn off from said second zone being employed to form said first suspension and preheated fresh gas drawn off from said third zone being employed to form said second suspension, said oxide being moved confluently with said gas through each one of said zones but said oxide moving through said first, second and third zones in said sequence while said gas moves successively through said third, second and first zones.

JOHN C. KALBACH.
VINCENT S. DE MARCHI.
FREDERICK W. SULLIVAN, JR.

REFERENCES CITED

The following references are of record in the file of this patent:

UNITED STATES PATENTS

| Number | Name | Date |
|---|---|---|
| 1,800,856 | Bradley | Apr. 14, 1931 |
| 1,984,380 | Odell | Dec. 18, 1934 |
| 1,969,264 | Grant | Aug. 7, 1934 |
| 1,984,727 | Brown | Dec. 18, 1934 |
| 2,107,549 | Schmalfeldt | Feb. 8, 1938 |
| 2,142,100 | Avery | Jan. 3, 1939 |
| 2,296,522 | Hartley | Sept. 22, 1942 |
| 2,316,664 | Brassert et al. | Apr. 13, 1943 |
| 2,371,619 | Hartley | Mar. 20, 1945 |
| 2,393,839 | Thomas et al. | Jan. 29, 1946 |
| 2,395,106 | Day et al. | Feb. 19, 1946 |
| 2,398,443 | Munday | Apr. 16, 1946 |
| 2,399,984 | Caldwell | May 7, 1946 |
| 2,407,371 | Jahnig | Sept. 10, 1946 |
| 2,409,707 | Roetheli | Oct. 22, 1946 |